(12) United States Patent
Travis, Jr.

(10) Patent No.: US 7,219,090 B2
(45) Date of Patent: May 15, 2007

(54) METHOD AND SYSTEM FOR BLENDING SEARCH ENGINE RESULTS FROM DISPARATE SOURCES INTO ONE SEARCH RESULT

(75) Inventor: Robert L. Travis, Jr., Casco, ME (US)

(73) Assignee: Overture Services, Inc., Pasadena, CA (US)

( * ) Notice: Subject to any disclaimer, the term of this patent is extended or adjusted under 35 U.S.C. 154(b) by 0 days.

(21) Appl. No.: 10/424,171

(22) Filed: Apr. 25, 2003

(65) Prior Publication Data

US 2004/0215607 A1    Oct. 28, 2004

(51) Int. Cl.
*G06F 17/30* (2006.01)
*G06F 15/16* (2006.01)

(52) U.S. Cl. .................. 707/3; 707/4; 707/104.1; 709/219

(58) Field of Classification Search ............ 707/1, 707/2, 3, 4, 101, 104.1, 6, 7; 705/1
See application file for complete search history.

(56) References Cited

U.S. PATENT DOCUMENTS

| | | | |
|---|---|---|---|
| 5,948,061 A * | 9/1999 | Merriman et al. | 709/219 |
| 6,006,222 A | 12/1999 | Culliss | 707/5 |
| 6,078,916 A | 6/2000 | Culliss | 707/5 |
| 6,182,068 B1 | 1/2001 | Culliss | 707/5 |
| 6,480,837 B1 | 11/2002 | Dutta | 707/3 |
| 2002/0169764 A1 * | 11/2002 | Kincaid et al. | 707/3 |
| 2002/0198869 A1 * | 12/2002 | Barnett | 707/3 |
| 2002/0198875 A1 * | 12/2002 | Masters | 707/4 |

* cited by examiner

Primary Examiner—Etienne P Ichawa
Assistant Examiner—Hassan "Tony" Mahmoudi
(74) Attorney, Agent, or Firm—Dreier LLP

(57) ABSTRACT

Provided is a method and system for blending a plurality of search engine results from a respective plurality of search sources into one search engine. A result list of entries is received from each search source. Each result list includes at least, for each entry on the list, a position of the entry, an address of a document, and a relevance score of the document. A determined transformation is applied to the relevance scores of at least a subset of the documents in at least one of the received result lists so as to generate transformed scores. Finally portions of the respective results lists are combined to produce a blended search engine result comprising a blended list of entries. The ordering of the blended list of entries is based, at least in part, on the transformed scores of the documents.

24 Claims, 7 Drawing Sheets

METHOD AND SYSTEM FOR BLENDING SEARCH ENGINE RESULTS FROM DISPARATE SOURCES INTO ONE SEARCH RESULT

FIELD OF THE INVENTION

The present invention relates to the field of search engines for locating documents in a collection of documents, such as documents stored on servers coupled to the Internet or in an intranet, and in particular the present invention relates to a method and system for blending a plurality of search engine results from a respective plurality of search engine sources to produce a blended search engine result.

BACKGROUND OF THE INVENTION

The Internet is a large network of computers, including both a large number of client devices and server devices. Among other functions, a server device sometimes provides, over the network, a document to a client device in response to a request sent by the client over the network. The request typically includes an address of the document. On the Internet, a uniform resource locator (URL) is often used to specify the address of the document, the URL identifying both the server and the particular document on the server that a client is requesting. The document may be one of any number of types of information that can be transmitted over the network, including text files, word processing files, audio clips, video clips, and any other type of electronic data. The collection of documents made available to client computers over the Internet in this way is commonly referred to as the World Wide Web ("the Web").

A computer connected to the Internet may be a client device, a server device, or both. A special type of server device on the Internet is referred to as a search engine system. Search engine systems also exist on networks other than the Internet, for example on corporate intranets. A user of a client device who desires information from the Web, but is unsure of the URL of any or all relevant documents, typically submits a request, referred to as a query, to a search engine. A query includes one or more terms that describe the type of information in which the user of the client device is interested. The search engine typically maintains a database of documents on the Web. Each database may include key terms, which may be words or any type of electronically storable data, and corresponding URLs of documents that contain the key terms. More generally, in place of or in addition to key terms, the database may store features of documents. Some features are values that directly represent properties of the document, an example of a feature being the length of the document. Other features enable some type of comparison between a document and a query, the frequency with which a given term in the query appears in the document serving as one example of such a comparison.

In response to a query submitted by a user of a client device, a search engine typically determines, based on its database, a subset of the documents in the index that are relevant to the query. Additionally, the search engine system typically includes a ranking function that estimates the relevance of each document in the subset to the query, generating a "relevance score" for each document in the subset relative to the query. Finally, the ranking function creates a search engine result, including an ordered list of entries. Each entry corresponds to one of the documents in the subset. An entry includes the URL of a corresponding document, so that the user can request the document from the Web, and a position of the entry in the list. The list is ordered so that documents having positions nearer to the beginning of the list (i.e., documents having numerically lower positions) have higher relevance scores (i.e., the relevance scores monotonically decrease as one moves from the beginning of the list towards its end).

The creation of a database of documents that accurately represents the content of the documents on the Web is a difficult problem. First, there are a large number of documents on the Web; estimates of the number of documents are currently in the billions. This creates difficulties in creating a single database that can both store information about all the documents and quickly retrieve that information when needed. Second, the content of the documents on the Web is dramatically diverse. Documents are produced by authors of varying skill, from professional reporters to young children, are composed in a variety of languages (sometimes employing different alphabets and electronic encoding schemes thereof) and are produced for a wide variety of purposes, from recreational use to electronic commerce. This makes the determination of which key terms and features of documents to include in a database a difficult problem. Finally, the contents of the documents on the Web, as well as the locations of the documents themselves, change rapidly. Various "crawling" strategies have been employed to mitigate this difficulty, each having its own respective advantages and disadvantages. Thus, the use of more than one database may be advantageous in a search engine system for use with a large, diverse, and time-varying collection of documents (such as the collection of documents on the Web).

Even if a single database were developed that accurately and efficiently characterized the documents available on the Web, the determination of the relevance score of a particular document in the database to a query would remain a difficult problem. The relevance score of a document is used to determine the position of the corresponding entry in the search engine result. A user typically only examines the first three or four entries in a search engine result, so accurate relevance score determination, at least for highly relevant documents, is an important factor in the user's satisfaction with the search engine result. A user's perception of the relevance of a particular document to a query is difficult to accurately replicate in a single algorithm for determining a relevance score. For this reason, it may be desirable to have more than one method available for determining a relevance score in a search engine system. For example, one method may be well-suited to determine the relevance scores of documents written in a single language (for example, English) and a second method best suited to the determine the relevance scores of documents in a second language (for example, Chinese). When a document in the database contains content in both languages, however, it will be difficult to decide which ranking function to use. As another example, the search engine system may include more than one database and have a separate ranking function for each database. In this way, the individual ranking functions may by optimized for determining relevance scores for documents from their respective databases. Statistical and machine learning techniques are increasingly used to perform this type of optimization. Thus, there is a need for a method and system to blend the search engine results that come from more than one ranking function.

Given the above background, it is desirable to devise a method and system for combining the search engine results from one or more search sources, each search source possibly employing a different database, ranking function, or both. In particular, it is desirable to devise a method for determining a blended search engine result in such a way that a user's perception of the relevance of, say, the top three documents in the blended search engine is superior, or at least not inferior, to the user's perception of the relevance of the top three documents from any of the individual search sources.

SUMMARY OF THE INVENTION

Some embodiments provide a method for blending a plurality of search engine results from a respective plurality of search sources into one search engine result. First, a respective result list of entries is received from each search source. A result list of entries includes, for each entry on the list, a position of the entry, an address of a document, and a relevance score of the document. Next, a determined transformation is applied to the relevance scores of a least a subset of the documents in at least one of the received result lists, generating transformed scores. Finally portions of the respective result lists are combined to produce a blended search engine result. The blended search engine result includes a blended list of entries. As part of the combining of the respective result lists, the entries in the blended list of entries are ordered based, at least in part, on the transformed scores.

Some embodiments further provide a method of determining a transformation for a first search source of the plurality of search sources. First, click rate statistics are measured and stored for at least the first search source and a second search source. Next, a figure of merit is determined for each of the first and second search sources. The figures of merit are determined, at least in part, by the measured and stored statistics. Finally, a set of coefficients is determined based on the figures of merit for the first and second search sources. The coefficients define a transformation of the relevant relevance scores for the first search source.

Some embodiments provide a search engine system. The search engine system includes a plurality of search sources. Additionally, the search engine system has at least one interface for receiving a query and for sending search results. The search engine system also includes at least one search engine coupled to the plurality of search sources. The at least one search engine is configured to receive, from each search source, a respective result list of entries corresponding to the received query. Each respective result list includes at least, for each entry on the list, a position of the entry, an address of a document, and a relevance score relating the document to the received query. The search engine system further includes a blending module configured to apply a determined transformation to the relevance scores of at least a subset of the entries in at least one of the received result lists, so as to generate transformed scores. The blending module is further configured to combine at least portions of the respective results lists to produce a blended search engine result comprising a blended list of entries, including ordering the blended list of entries. The ordering of the blended list of entries is determined, at least in part, by the transformed scores.

In some embodiments, the search engine system further includes a transformation determining module. The transformation determining module is configured to determine a transformation for a first search source of the plurality of search sources. First, the transformation determining module measures and stores click rate statistics for each of the first search source and a second search source. Next, the transformation determining module determines a figure of merit for each of the first and second search sources. Determining a figure of merit is based, at least in part, on the measured and stored statistics. Finally, the transformation determining module determines, for the first search source, a set of coefficients based on the figures of merit for the first and second search sources. The set of coefficients so determined defines a transformation for the first search source.

In some embodiments, the search engine system is further configured to measure and store click rate statistics for the first search source and for a second search source. The search engine is further configured to receive a query from a user, return a blended result to the user, the blended result including a list of entries. The transformation determining module is further configured to record which item, if any, in the list of entries is selected by the user. The search engine system is further configured to repeat the receiving, returning, and recording until a termination condition is reached.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF THE PREFERRED EMBODIMENTS

Figure 1A:
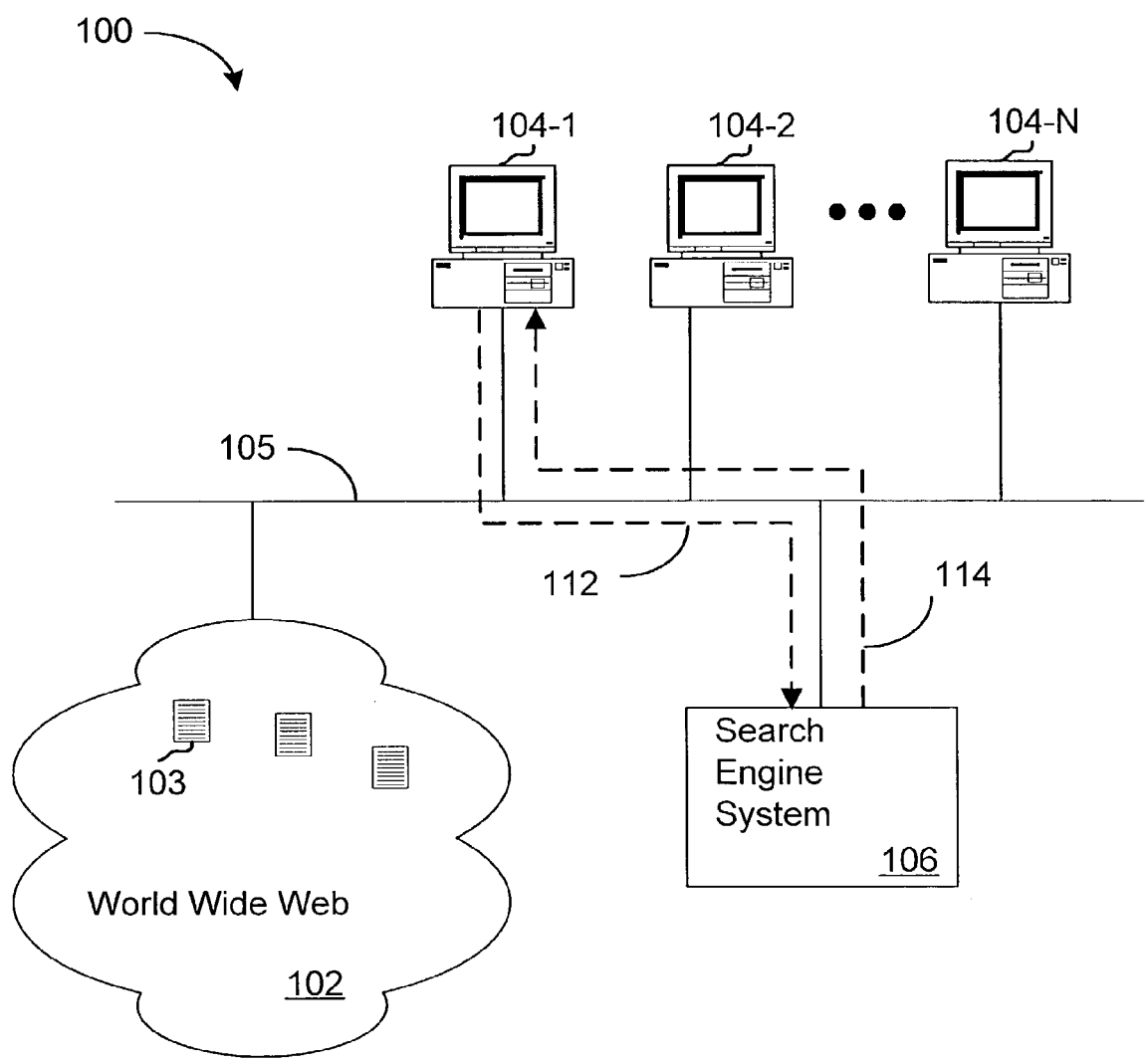
FIG. 1A illustrates a possible context for use of the disclosed method and system, including a network, one or more client computers, the World Wide Web, and a search engine system.

Referring to FIG. 1A, in a networked environment 100 a network 105 connects one or more client computers 104, a search engine system 106, and a collection of documents 103, in this case the World Wide Web 102. Client computer 104-1 submits a query 112 through network 105, and the query 112 is received by search engine system 106. Search engine system 106 responds by providing a blended search engine result 114 to the client computer 140-1 through the network 105.

Figure 1B:
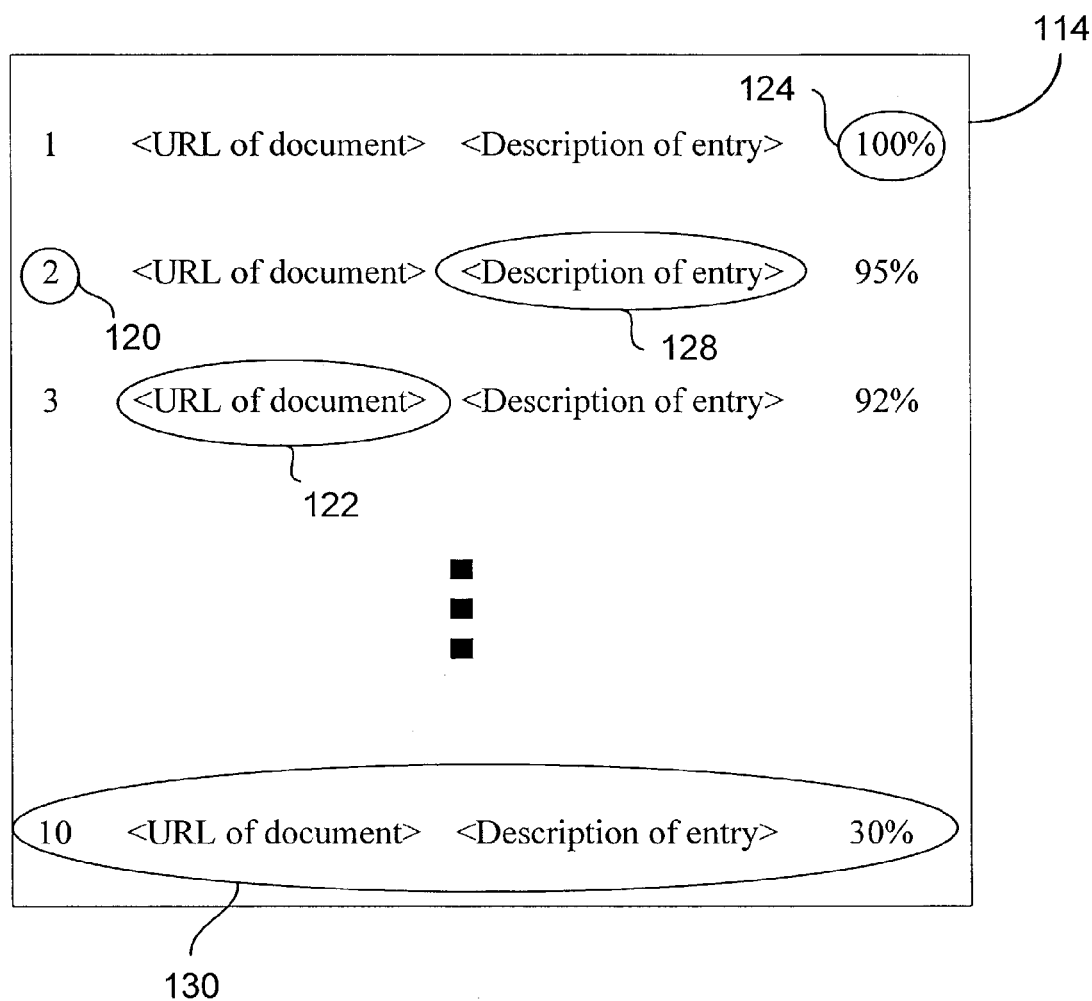
FIG. 1B illustrates a search engine result, including a list of entries and, associated with each entry, a position, an address of a corresponding document, a description of the corresponding document, and a relevance score.

Now that a possible context for use of a search engine system 106 has been described, a blended search engine result 114 will be further described. Referring to FIG. 1B, a blended search engine result 114 includes a list of entries 130. Each entry 130 is associated with a corresponding document on the network. Typically, in response to a query 112 (FIG. 1A), a search engine system will provide entries 130, as part of blended result 114, that are associated with documents that are highly relevant to the query 112. To facilitate location and retrieval of a document by the user, each entry 130 sometimes includes the URL 122 of the document. The URL 122 may not be visible to the user of client computer 104 as, for example, where the URL is provided to the user as part of a hypertext markup language (HTML) anchor tag. Instead of, or in addition to, the URL 122, in other embodiments an entry 130 may include other forms of address information for the document associated with an entry. To assist the user in evaluating the relevance of an associated document, each entry 130 may contain a brief description 128 of the document. For example, an entry 130 may contain the first few lines of text found in the document associated with the entry.

Each entry 130 (and its associated document) in the list of entries in blended search engine result 114 has both a position 120 in the list and a blended relevance score 124. The position 120 may or may not be explicitly included in the search engine result. If the position 120 is not explicitly included, it can be determined based on the position of an entry relative to the other entries on the list. The blended relevance scores 124 are used by the search engine system in determining the positions 120 of the entries 130. The blended relevance scores 124 of the documents typically assume numerical values in the range between 0 to 1 or, equivalently, the range between 0% and 100%. Although only 10 entries are depicted in FIG. 1B, more or fewer entries might be present in a blended search engine result 114.

A user of client computer 104-1 (FIG. 1A) is presented with a visual depiction of search engine result 114, and can select a document for viewing by clicking on the entry 130 associated with the document by placing a cursor 126 over the entry 130 (i.e., over an associated region of the client computer's display) and clicking on it. A user who is presented with an entry as part of a blended search engine result is said to have had an "impression" of the entry. When a user clicks on the entry, a "clickthrough" of the entry has occurred.

Figure 2A:
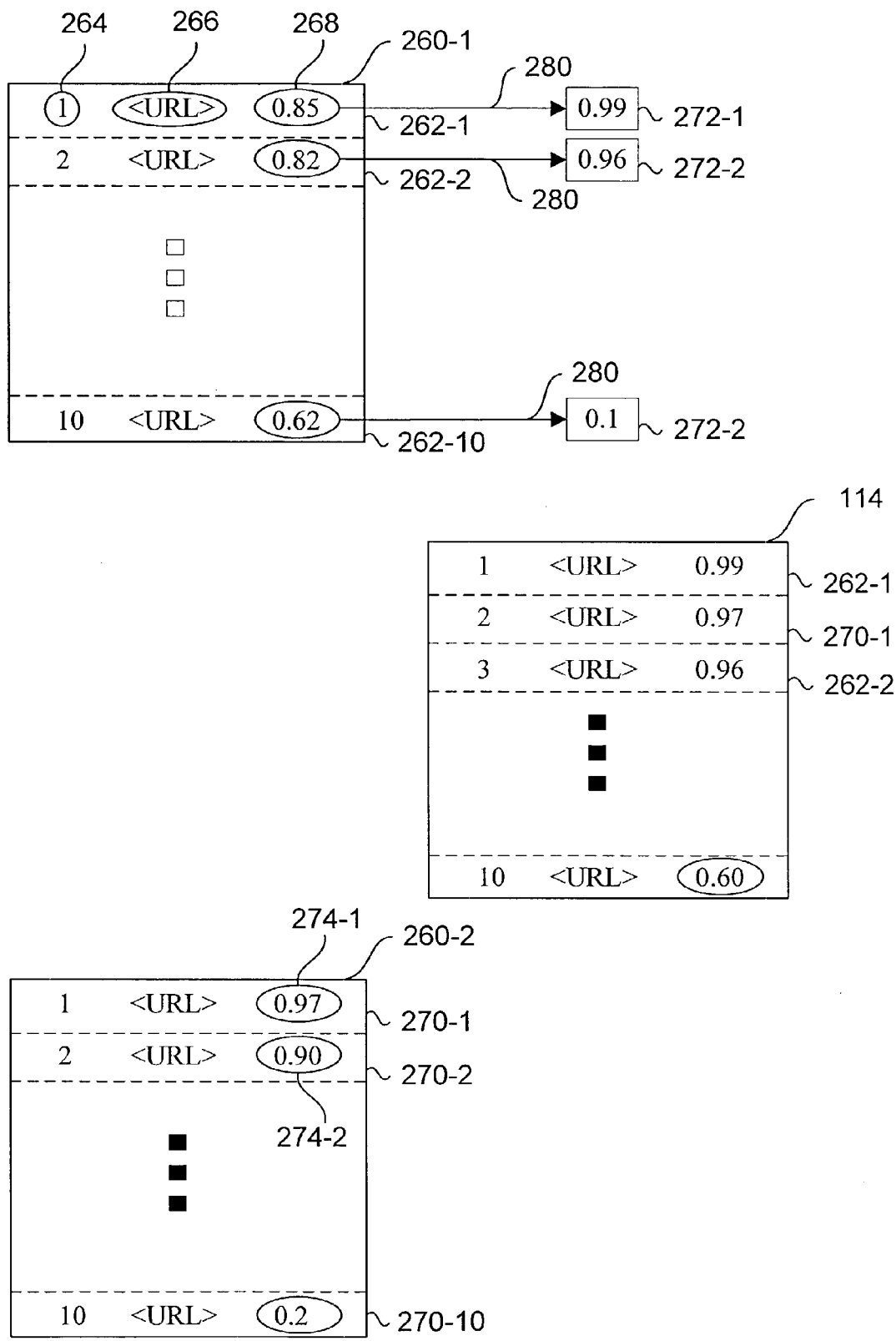
FIG. 2A illustrates a first list of entries from a first search source, a second list of entries from a second search source, transformed scores obtained by applying a transformation to the relevance scores of the first list of entries, and a blended search engine result.

Now that a blended search engine result has been described, the process of blending a plurality of search engine results from a respective plurality of search sources into a single blended search engine result 114 is described. Referring to FIG. 2A, in a preferred embodiment two search engine result sets 260 (also herein called result lists, or simply "results") are received, one from each of two search sources. The search engine result set 260-1, received from a first search source, includes a list of entries 262. Each entry 262, in turn, includes a position 264, an address 266 of a document in the database of the first search source, and a relevance score 268. Similarly, search engine result set 260-2 from a second search source also includes a list of entries 270. Each entry 270 includes a relevance score 274.

One goal of blending the search engine result sets 260 into a single blended search engine result 114 is to produce a list of entries in the result 114 that contains the most highly relevant entries, as would be judged by a user, from amongst entries of the result sets 260. Additionally, it is desired that the list of entries in the result 114 is ordered so that, as the position on the list increases, the user-perceived relevance of the document corresponding to the entry decreases, or at least does not increase (i.e., relevance decreases monotonically as one progresses down the list). In principle, the relevance scores 268 of the first result set 260-1 and the relevance scores 274 of the second result set 260-2 could be used directly to rank the entries from both of the result sets 260. For example, the entry with the highest relevance scores from amongst the two result sets could be selected, added to the blended result, and removed from its originating result set. This process could be repeated until the blended result contains a predetermined number of entries. However, this may not be effective in producing a list of entries ordered in terms of user-perceived relevance. For example, the relevance scores 268 and the relevance scores 270 may not be on comparable scales, one perhaps assuming values in the range form 0 to 1 and the other perhaps assuming values in the range from 4 to 100. Moreover, the scores may be determined by ranking functions employing different criteria in the determination of relevance, and thus not be directly comparable.

To solve this problem, embodiments of a search engine system apply a determined transformation 280 (the determination of which is described below in connection with FIG. 3) to the relevance scores 268 of the entries 262 in the first result set 260-1. For example, transformation 280 takes the relevance score (having a value of 0.85) of entry 262-1 and produces a transformed score 272-1, the transformed score 272-1 having a value of 0.99. Similarly, transformation 280 is applied to the other relevance scores 268, producing a set of transformed scores 272.

Next, the entries from result set 260-1 and result set 260-2 are combined based on the transformed scores 272 of the first result set 260-1 and the relevance scores 274 of the second result set 260-2. Some embodiments first select the entry having the largest score from amongst the transformed scores of the first result and the relevance scores of the second result. For example, in FIG. 2A, entry 262-1 is selected for the first position in the blended result 114 because the corresponding transformed score 272-2 of entry 262-1, having a value of 0.99, is higher than any of the relevance scores 274 and any other of the transformed scores 272. Entry 262-1 is placed in the first position of the blended result 114. Entries having successively lower scores are selected and placed in the result set 114 until the result set 114 contains a predetermined number of entries, in this case 10. Alternately, all the entries in the first and second sets 260 are selected and placed in the result set 114 in accordance with the transformed scores 272 of result set 260-1 and the relevance scores 274 of result set 260-2. For example, entry 270-1 is placed in the second position in result 114 because the corresponding relevance score 274-1, having a value of 0.97, is higher than all other relevance scores 274 and all transformed scores 272 except transformed score 272-1. Similarly, entry 262-2 is placed in the third position in result 114.

Figure 2B:
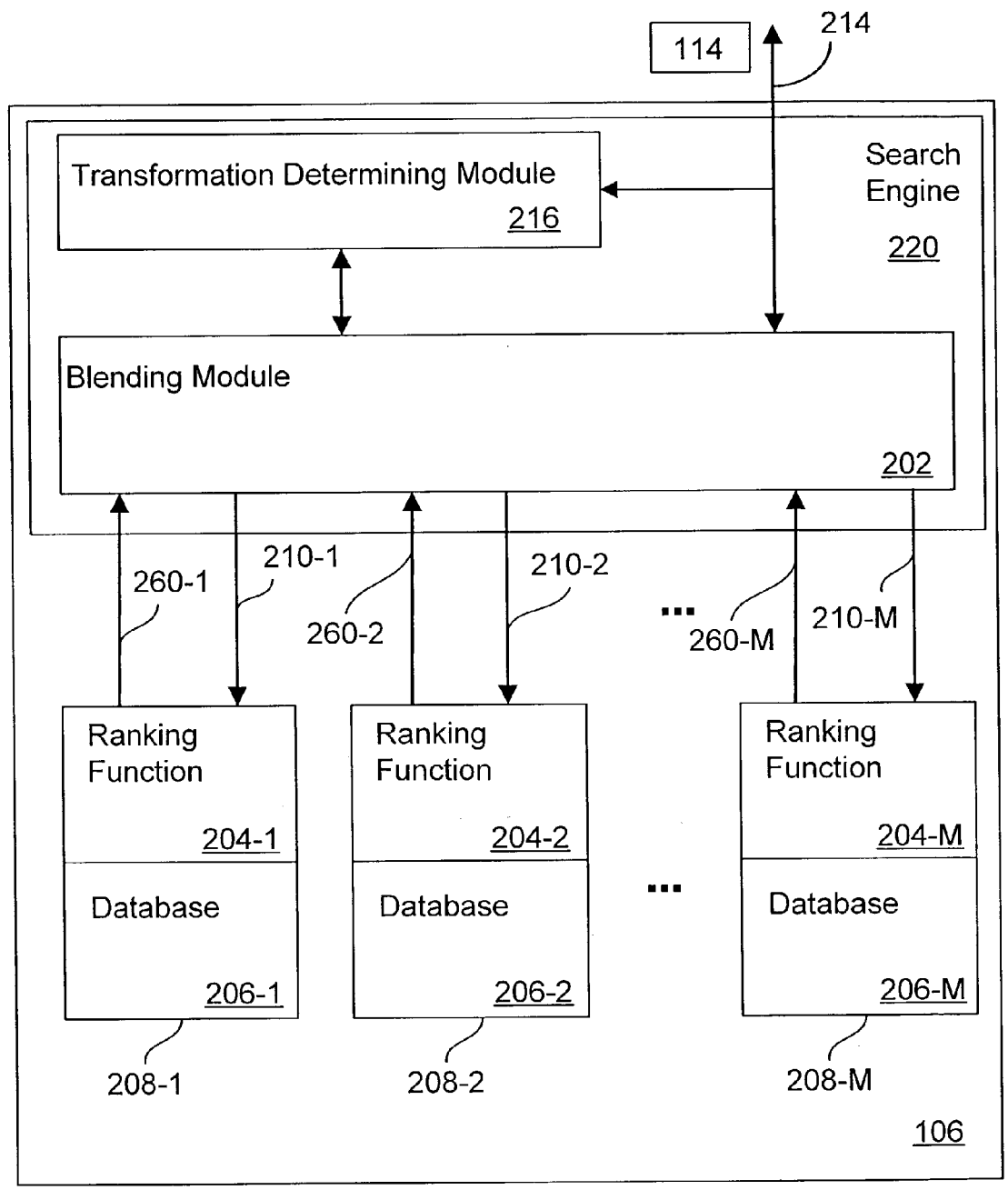
FIG. 2B is block diagram of a search engine system, including a blending module, a transformation determining module, a plurality of search sources, a search engine, and an interface.

Although the blending of search engine results from two search sources has been described in conjunction with FIG. 2B, in other embodiments more search engine results are received from a correspondingly larger number of search sources. For example, in one embodiment five search engine results may be received from five search sources. In some embodiments, a transformation is applied to the relevance scores of all but one result set, after which the result sets are combined in accordance with their transformed relevance scores. Additionally, each result 260 may contain fewer or more than 10 entries. Similarly, in other embodiments blended search result 114 contains more or fewer than 10 entries. The number of entries in the blended result 114 need not be the same as the number of entries in any result 260. Similarly, the results 260 may all have correspondingly different numbers of entries.

Now that the process of producing a blended search engine result 114 has been described, a search engine system capable of producing a blended search engine result is described. Referring to FIG. 2B, a search engine system 106, in accordance with one embodiment, is shown. Search engine system 106 includes two or more search sources 208. Each search source 208 has an associated ranking function 204 and database 206. System 106 further includes an interface 214 for receiving queries and for sending blended search engine results 114. System 106 also includes a search engine 220 coupled to the two or more search sources 208. When search engine 220 receives a query via interface 214, search engine 220 sends conveys corresponding queries 210 to one or more of the search sources 208. In some embodiments, the queries 210 may be identical to the query received by engine 220. In other embodiments, engine 220 may only send the received query to sources 208 that have appropriate databases 206 relevant to the query. For example, in some embodiments, if search engine system 106 receives a query containing terms in a particular language (e.g. Chinese), engine 220 only sends the query to a source (e.g. 208-2) having a database (e.g. 206-2) indexing documents in that language. Similarly, if system 106 receives a query containing terms in a second language, engine 220 only passes the query to sources 208 having databases 206 that index documents in the second language. In still other embodiments, engine 220 may send queries 210 to sources 208, the queries 210 differing from the query received by the system 106. For example, the original query may be restructured by the search engine 220 in order to be properly presented as a query 210 to a particular source 208.

Search engine 220 is coupled to the search sources 208 so that it can receive, from each source 208, a respective result list 260. A result list 260 includes a list of entries, each entry having an associated position on the list, an address of a corresponding document in the database of the search source 208 of the list, and a relevance score relating the corresponding document to the query 210. Typical result lists 260 are illustrated in conjunction with the above discussion of FIG. 2A.

Search engine system 106 further includes a blending module 202. The blending module 202 is configured to apply a determined transformation to the relevance scores of at least a subset of the entries in at least one of the received result lists 260 so as to generate transformed scores. Blending module 202 is further configured to combine at least portions of the respective results lists 260 to produce a blended search engine result comprising a blended list of entries, including ordering the blended list of entries, based at least in part on the transformed scores. The blended list of entries is then provided, via interface 214, as part or all of a blended search engine result. The process of applying a determined transformation, combining portions of result lists 260, and forming a blended search engine result is discussed in detail above, in conjunction with the discussion of FIG. 2A.

Search engine system 106 optionally includes a transformation determining module 216. Transformation determining module 216 is configured to determine one or more transformations for one or more search sources 208. Determining a transformation for a search source is discussed below in conjunction with the discussion of FIG. 3. The transformation, once determined, is provided to blending module 202. In some embodiments, both blending module 202 and transformation determining module 216 are included in the search engine 220. In other embodiments, blending module 202 and/or the optional transformation determining module 216 may be part of other systems included in search engine system 106. In some embodiments, the search sources 208 and the search engine 220 are implemented on different computers. In these embodiments, the passing of queries 210 and respective result lists 260 is performed, for example, over the network 105 (FIG. 1A).

Now that a search engine system has been described, a method (for use, in some embodiments, by transformation determining module 216 of FIG. 2A) of determining a transformation is described. Referring to FIG. 3, in a preferred embodiment of a method 300 for determining a transformation, click rate statistics for a first search source and for a second search source are first measured and stored in step 302. Referring to FIG. 4, in some embodiments, the event of the user clicking on one of the entries in blended search engine result 114 (as depicted, for example, in FIG. 1B) is recorded by the search engine system 106 (FIG. 2B). When a user clicks on one of the entries of the blended search engine result 114, a request 401 is sent to the search engine system 106 (e.g., to the transformation determining module 216 of the search engine 220). The request 401 contains information about the position of the selected entry in the blended search engine result 114. In order for the user click to result in a request 401 being sent to the search engine system 106, the URL associated with each item in the result list is changed so that selection of the item causes an http message (i.e., the request 401) to be sent to the search engine server instead of the server storing the document selected by the user. The http message (request) 401 includes the URL associated with the selected document, as well as the position of the selected item in the result list.

In response to receipt of the request, search engine 220 records the position of the selected entry in blended result 114. Additionally, the search engine 220 records the search source from which the selected entry was obtained when two or more result lists (for example, 260-1 and 260-2 in FIG. 2B) were combined to produce blended result 114. Furthermore, the search engine 220 records the search source and position of all non-selected entries in blended result 114. The storing may be done, for example, by transformation determining module 216 (FIG. 2B). In a preferred embodiment, information about the result list presented to the user is recorded in a log record when the result list is sent to the user. Information about the item selected by the user is recorded in a second log record. The second log record may include a reference or pointer to the first log record.

Still referring to FIG. 4, it is necessary that the user of client computer 104-1 receive the document corresponding to the entry selected from search engine result 114. To accomplish this, the search engine system 106 sends an "http redirect" response 402 to the client computer 104-1, specifying the URL of the requested document. The http redirect 402 causes the client computer 104-1 to download and display the document corresponding to that URL (403, 404). In another embodiment, the search engine system 106 may download the requested document and then send that document to the client computer 104-1.

It is not necessary to record information about the entries of blended results 114 every time a user of a client computer 104 selects an entry from a blended result. In some embodiments, then, the recording of the user's selection from the blended result is only performed for selected blended results 114, which may be selected randomly or otherwise. In this way, system 104 is not overburdened by processing every request generated by a user selecting an entry from a blended result. For example, system 106 may generate blended results 114 so that only one out of every 100 results, when an entry thereon is selected by a user, generates a request 401.

In some embodiments, in response to a user selecting an entry from a blended search engine result, the position and search source of the selected entry is recorded. Additionally, the position and source of entries not selected, but present in the blended result, are also recorded. It is then desired to determine, from these data, a transformation to be applied to the relevance scores generated by one or more of the search sources. In some embodiments, for each search source h and each position i in a blended search result, a relative click ratio is determined. The relative click ratio (RCR) for source h and position i is determined, in some embodiments, in accordance with the following:

$$RCR(i, h) = \frac{CBS(i, h)}{CR(i)}$$

where CR(i) is the click-through ratio for results at position i, independent of source:

$$CR(i) = \frac{\text{clickthroughs}(i)}{\text{impressions}(i)}$$

where "clickthroughs(i)" is the total number of recorded clickthroughs by users at position i during a measurement interval (e.g., a period of a day or several days), and "impressions(i)" is the total number of times a blended result containing an entry in position i was presented to a user during the same measurement interval (and where the results were configured so as to inform the server of which item, if any, was selected by the user). In the above equation, CRS(i) is the clickthrough ratio for results at position i when the source of the result at position i is from source h:

$$CRS(i) = \frac{\text{clickthroughs}(i, h)}{\text{impressions}(i, h)}$$

where "clickthroughs(i,h)" is the number of times that a user selected an entry in position i from the blended search result, where the entry in position i was originally obtained from search source h, and "impressions(i,h)" is the total number of times a blended result containing an entry in position i from source h was presented to a user (and where the results were configured so as to inform the server of which item, if any, was selected by the user). Thus, the RCR is essentially a proxy for the relative frequency an entry from a particular source is selected from a particular position in the blended result.

Figure 3:
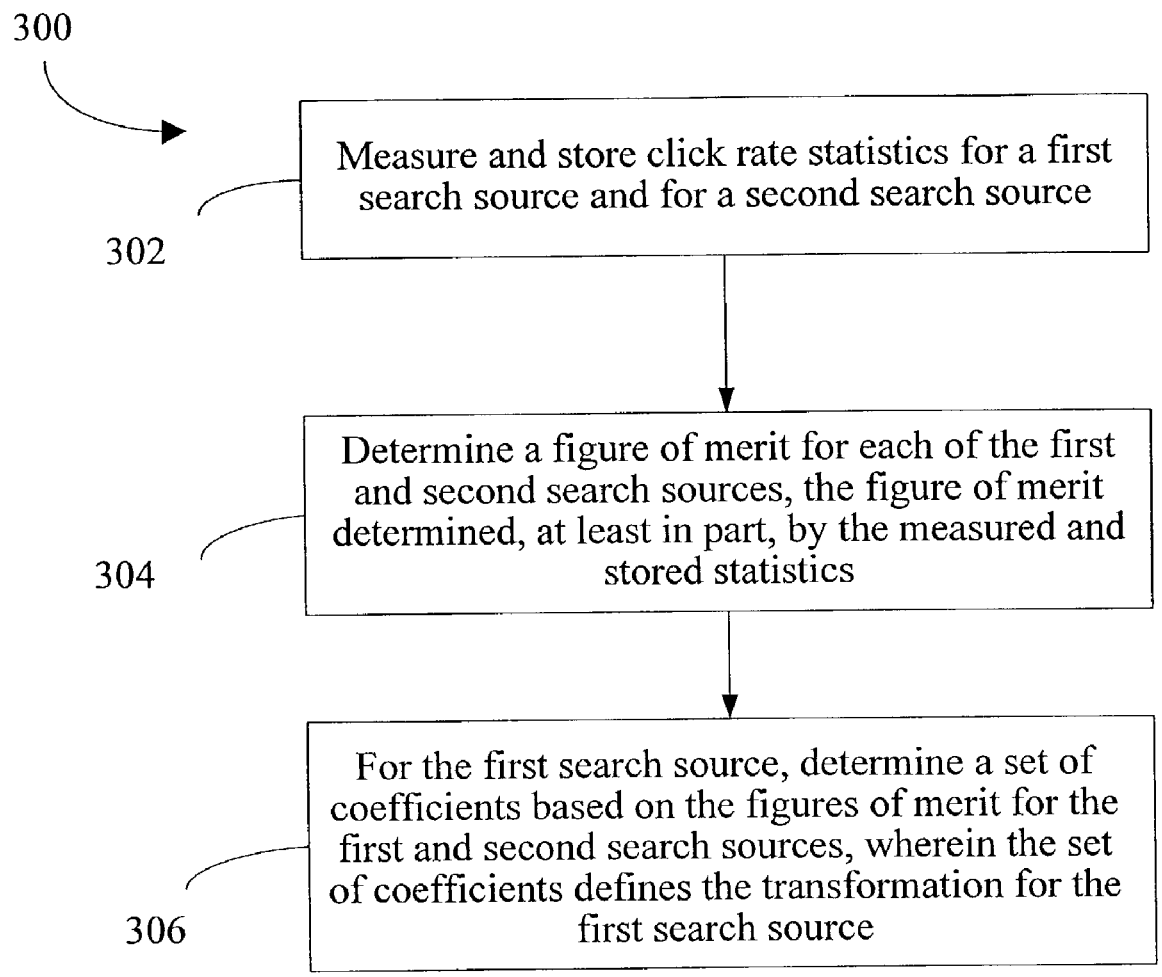
FIG. 3 illustrates a method of determining a transformation.
Figure 4:
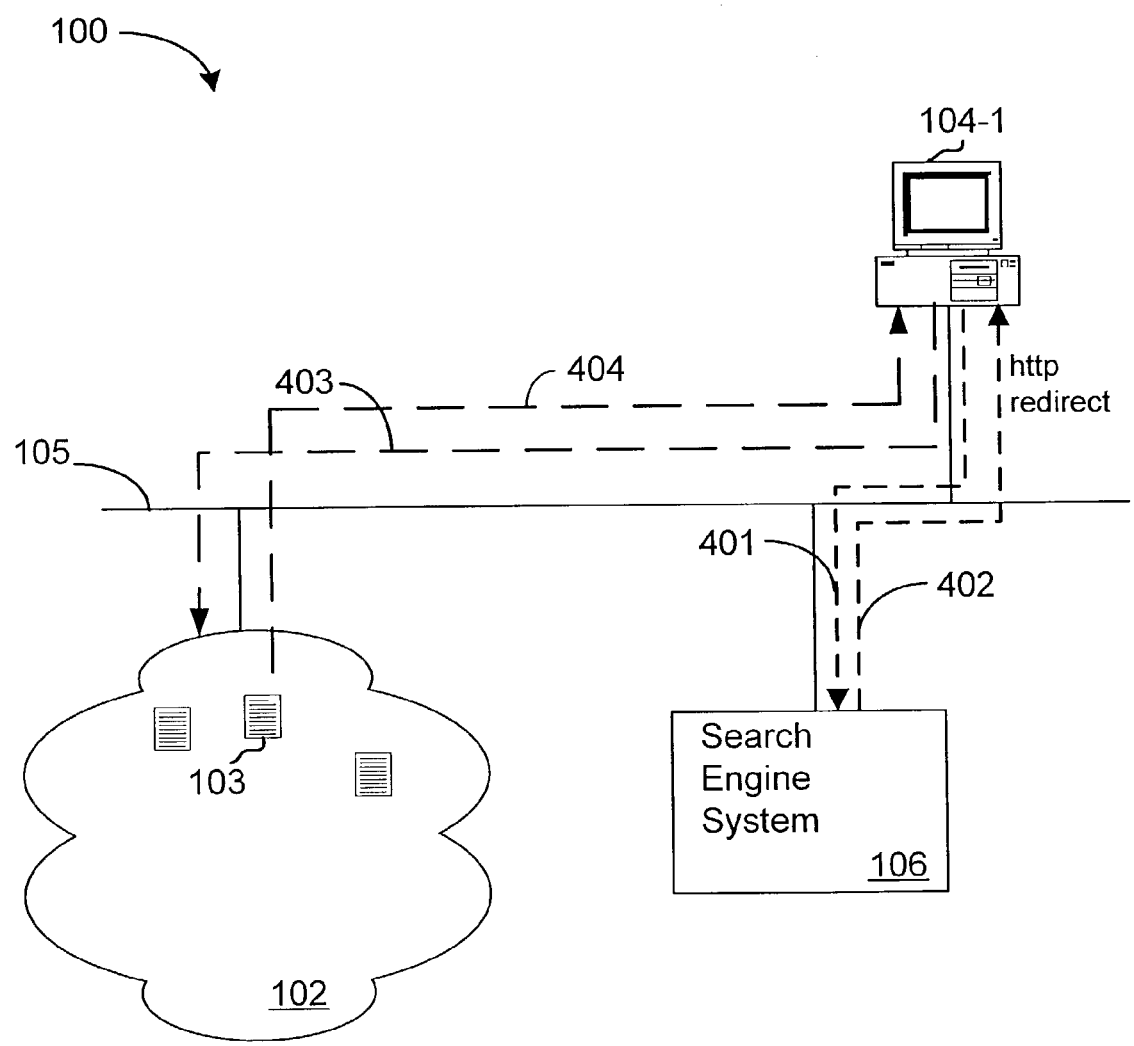
FIG. 4 illustrates the anonymous recording of which item, if any, in the list of entries in a blended search engine result has been selected by the user.

Referring to FIG. 3, in a method 300 of determining a transformation, a figure of merit is determined for at least a first source and a second source. A figure of merit for source h is determined in one embodiment in accordance with the following:

$$F(h) = \sum_{i=1}^{10} P(i, h) RCR(i, h)$$

where P(i,h) is referred to as the impression rate for position i in the blended result and source h. Although the summation in the above expression is performed from positions 1 to 10, the summation in other embodiments may be taken from position 1 to a final position lower or higher than position 10. The impression rate P(i,h) is determined in accordance with the following:

$$P(i, h) = \frac{\text{Impressions}(i, h)}{\sum_i \text{Impressions}(i, h)}$$

where Impressions(i,h) is the number of times the blended result contained an entry in position i from source h. If a source 208 (FIG. 2B) provides entries to the blended result, but these entries are rarely selected by the users (relative to the frequency with which the users select entries from other sources) the figure of merit F(h) will have a value close to zero. Conversely, if a source provides entries to the blended result, and these entries are frequently selected by the users, the figure of merit F(h) will have a value greater than or equal to one. Values greater than one indicate user selection at a rate greater than average, and values less than one indicate user selection at a rate less than average. Thus, the figure of merit F(h) of a source h serves as a proxy for the user's perception that entries from that source have been correctly placed in positions in the blended result.

Finally, in a method 300 of determining a transformation, one or more sets of coefficients are determined based on the figures of merit for the sources in step 306. For a particular source, a set of coefficients is used to define a transformation to be applied to the relevance scores from that source. For example, the transformation may be a shifting transformation, in which case the transformation is performed in accordance with TransformedScore=RelevanceScore+b, where only one coefficient, b, is used to define the transformation. Typical values for this shifting coefficient, when the relevance scores range approximately from 0.0 to 1.0, are in the range from −0.04 to 0.04. Other possible transformations include scaling transformations, in which the transformation is performed in accordance with TransformedScore=a*RelevanceScore, where again only one coefficient, a, is used to define the transformation. Typical values for this scaling coefficient, when the relevance scores range approximately from 0.0 to 1.0, are in the range from 0.9 to 1.1. Other possible transformations include affine transformations, in which the transformation is performed in accordance with TransformedScore=a*RelevanceScore+b, where two coefficients, a scaling coefficient a and a shifting coefficient b, are used to define the transformation. When the relevance scores range approximately from 0.0 to 1.0, typical values for the scaling coefficient a are in the range from 0.9 to 1.1 and typical values form the shifting coefficient b are in the range from −0.04 to 0.04.

One goal of determining the coefficients of the transformations applied to the relevance scores of one or more sources is to equalize the figures of merit for all of the sources. In some embodiments, a set of heuristic rules are applied to determine the coefficients of the transformations, based on the figures of merit of the sources. One type of heuristic rule requires that, when a ratio of a first figure of merit to a second figure of merit is within a predefined range of values, the coefficients of the transformation to be applied to the relevance scores of the first source assume predefined coefficient values. For example, the rule may require that, when the ratio of the figure of merit of the first source to the figure of merit of the second source, $F(1)/F(2)$, is between 0.2 and 0.4, the value of the shifting coefficient in a shifting transformation of the relevance scores of the second source assumes a value of 0.04. Another rule may require that, when $F(1)/F(2)$ is between 0.4 and 0.6, the value of the shifting coefficient in a shifting transformation of the relevance scores of the second source assumes a value of 0.02. In this way, transformation of the relevance scores of the first source will be determined in such a way that the figures of merit of the first and second source tend to equalize without unnecessary overshoot.

In other embodiments, the transformation functions used may be functions other than the shifting, scaling and affine functions described above. In particular, other embodiments may use blending transformation functions that are a function of both the available scores (from the search source whose relevance scores are being transformed) and the results from the other sources. In other words, the transformation function applied to results from source A may be a complex function involving parameters from or associated with the other sources, not just fixed coefficients associated with source A.

Figure 5:
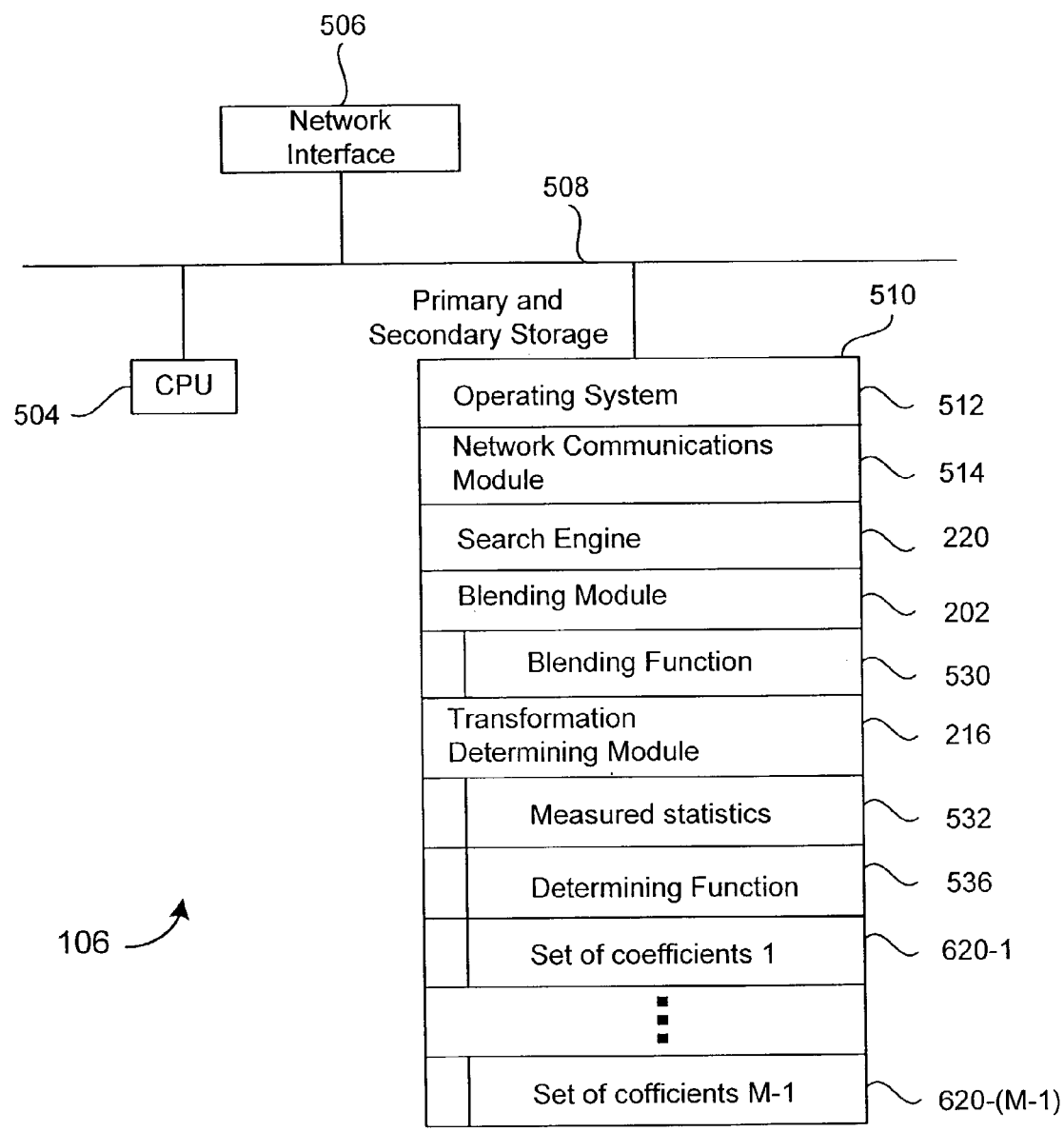
FIG. 5 illustrates a computer system capable of implementing the disclosed search engine systems and methods.

In a preferred embodiment, the search engine system 106 is implemented using one or more computer systems, as schematically shown in FIG. 5. As will be appreciated by those of skill in the art, search engine systems designed to process large volumes of queries may use more complicated computer architectures than the one shown in FIG. 5. For instance, a front end set of servers may be used to receive and distribute queries among a set of back end servers that actually process the queries. In such a system, the system 106 shown in FIG. 5 would be one of the back end servers.

The computer system will typically have one or more central processing units (CPU's) 504, a network or other communications interface 506, primary and secondary storage 510, and one or more communication busses 508 for interconnecting these components. Primary and secondary storage 510 can include high speed random access memory and can also include non-volatile memory, such as one or more magnetic disk storage devices (not shown). Primary and secondary storage 510 can include mass storage that is remotely located from the central processing unit(s) 504. The primary and secondary storage 510 preferably stores:

an operating system 512 that includes procedures for handling various basic system services and for performing hardware dependent tasks;

a network communication module 514 that is used for connecting the system 106 to various client computers 104 (FIG. 1A) and possibly to other servers or computers via one or more communication networks, such as, the Internet, other wide area networks, local area networks (e.g., a local wireless network can connect the client computers 104 to system 106), metropolitan area networks, and so on;

a search engine 220 for receiving a query 112 from a client computer 104, and for generating (or receiving) one or more result lists from one or more search sources; the search engine (or search engines with the search sources) search the search source databases for documents related to the query 112 and determining relevance scores of documents that are related to the query;

a blending module 202, for implementing many aspects of the present invention; and a transformation determining module 216, for implementing many aspects of the present invention.

Blending module 202 can include executable procedures, sub-modules, tables and other data structures. In one embodiment, blending module 202 includes a blending function 530 for combining the result lists provided by one or more search sources.

Transformation determining module 216 may be implemented on a different server than the blending module, since its role is to collect click-through data, which is averaged over time. New transformation function coefficients are determined periodically, much less frequently than queries are processed. For instance, new transformation function coefficients may be computed and distributed to the blending module(s) once per day, or perhaps once every few days. Transformation determining module 216 can include executable procedures, sub-modules, tables and other data structures. In one embodiment, transformation determining module 216 includes:

a data structure 532 for storing measured click rate statistics;

a determining function 536 for determining the sets of coefficients, the determining function possibly including one or more heuristic rules; and one or more data structures 620 for storing determined sets of coefficients.

In an alternate embodiment, a transformation function is defined for every search source, with each transformation function being initially assigned one or more coefficient values associated with a unity transformation (i.e., a transformation that does not change the scores for that source). Then coefficient values for various ones of the transformation functions are assigned, as described above, based on the information collected by the transformation defining module. In some implementations, all of the transformation functions may be assigned coefficients so that a non-unity transformation is performed on the scores for every search source. However, as explained above, when blending the results from N search sources, a non-unity transformation will generally be needed for at most N−1 of the search sources.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed is:

1. A method for blending a plurality of search engine results from a respective plurality of search sources into one search engine result, comprising:

receiving, from each search source, a respective result list of entries, the respective result list including at least, for each entry on the list, a position of the entry, an address of a document, and a relevance score of the document;

applying a determined transformation to the relevance scores of at least a subset of the documents in at least one of the received result lists so as to generate transformed scores; and combining at least portions of the respective results lists to produce a blended search engine result comprising a blended list of entries, including ordering the blended list of entries, based at least in part on the transformed scores of the documents, wherein the transformation is determined for a first search source of the plurality of search sources by:

measuring and storing click rate statistics for the first search source and for a second search source;

determining a figure of merit for each of the first and second search sources, the figure of merit determined, at least in part, by the measured and stored statistics; and for the first search source, determining a set of coefficients based on the figures of merit for the first and second search sources, wherein the set of coefficients defines the transformation for the first search source.

2. The method of claim 1, including determining the set of coefficients by applying a set of heuristic rules, one or more of the heuristic rules requiring that, when a ratio of the first figure of merit and the second figure of merit is within a predefined range of values, the coefficients of the transformation assume predefined coefficient values.

3. The method of claim 1, wherein the transformation is an affine transformation, determined by two coefficients.

4. The method of claim 1, wherein the transformation is a scaling transformation, determined by one coefficient.

5. The method of claim 4, wherein the coefficient takes on a value in the range from 0.9 to 1.1.

6. The method of claim 1, wherein the transformation is a shifting transformation, determined by one coefficient.

7. The method of claim 6, wherein the coefficient takes on values from the range from −0.04 to 0.04.

8. The method of claim 1, wherein measuring and storing click rate statistics comprises:

receiving a query from a user, returning a blended result to the user, the blended result comprising a list of entries; recording which entry, if any, in the list of entries is selected by the user; and repeating the receiving, returning, and recording until a termination condition is reached.

9. The method of claim 8, wherein recording includes recording whether the user selected no item from the list of entries.

10. The method of claim 8, wherein measuring and storing click rate statistics further comprises:

recording a search source and a position associated with a selected entry in the blended result, the selected entry selected by the user; and recording a search source and a position associated with an entry in the blended result not selected by the user.

11. The method of claim 10, wherein determining a figure of merit for the first search source comprises:

determining, for each of the plurality of search sources, a respective plurality of numbers of impressions for a plurality of positions in the blended result;

determining, for the first search source, a first number of times the user selected an entry associated with the first search source in a position in the blended result; and determining the figure of merit for the first search source based, at least in part, on the first number of times and the plurality of numbers of impressions.

12. A search engine system, comprising:

a plurality of search sources;

at least one interface for receiving a query and for sending search results;

at least one search engine coupled to the plurality of search source for receiving, from each search source, a respective result list of entries corresponding to the received query, the respective result list including at least, for each entry on the list, a position of the entry, an address of a document, and a relevance score relating the document to the received query;

a blending module configured to apply a determined transformation to the relevance scores of at least a subset of the entries in at least one of the received result lists so as to generate transformed scores, and further configured to combine at least portions of the respective results lists to produce a blended search engine result comprising a blended list of entries, including ordering the blended list of entries, based at least in part on the transformed scores; and a transformation determining module configured to determine the transformation for a first search source of the plurality of search sources, the transformation determined module measuring and storing click rate statistics for the first search source and for a second search source, determining a figure of merit for each of the first and second search sources, the figure of merit determined, at least in part, by the measured and stored statistics, and, for lthe first search source, determining a set of coefficients based on the figures of merit for the first and second search sources, wherein the set of coefficients defines the transformation for the first search source.

13. The search engine system of claim 12, wherein the at least one search engine includes the blending module.

14. The search engine system of claim 12, wherein the at least one search engine includes the transformation determining module.

15. The search engine system of claim 12, wherein the transformation determining module is further configured to determine the set of coefficients by applying a set of heuristic rules, one or more of the heuristic rules requiring that, when a ratio of the first figure of merit and second figure of merit is within a predefined range of values, the coefficients of the transformation assume predefined coefficient values.

16. The search engine system of claim 12, wherein the transformation is an affine transformation, determined by two coefficients.

17. The search engine system of claim 12, wherein the transformation is a scaling transformation, determined by one coefficient.

18. The search engine system of claim 12, wherein the coefficient takes on a value in the range from 0.9 to 1.1.

19. The search engine system of claim 12, wherein the transformation is a shifting transformation, determined by one coefficient.

20. The search engine system of claim 12, wherein the coefficient takes on values from the range from −0.04 to 0.04.

21. The search engine system of claim 12, wherein the search engine system is further configured to measure and store click rate statistics for the first search source and for a second search source, the configuration comprising:
the search engine further configured to receive a query from a user,
the search engine further configures to return a blended result to the user, the blended result comprising a list of entries;
the transformation determining module further configured to record which item, if any, in the list of entries is selected by the user;
the search engine system further configured to repeat the receiving, returning, and recording until a termination condition is reached.

22. The search engine system of claim 21, wherein the transformation module is further configured to record whether the user selected no entry from the list of entries.

23. The search engine system of claim 21, wherein the transformation module is further configured to:
record a search source and a position associated with a selected entry in the blended result, the selected entry selected by the user; and
record a search source and a position associated with an entry in the blended result not selected by the user.

24. The search engine system of claim 23, wherein the transformation determining module is further configured to determine a figure of merit for the first search source by:
determine, for each of the plurality of search sources, a respective plurality of numbers of impressions for a plurality of positions in the blended result;
determine, for the first search source, a first number of times the user selected an entry associated with the first search source in a position in the blended result; and
determine the figure of merit for the first search source based, at least in part, on
the first number of times and the plurality of numbers of impressions.

* * * * *